UNITED STATES PATENT OFFICE.

ALEXANDER W. GILLMAN AND SAMUEL SPENCER, OF SOUTHWARK, COUNTY OF SURREY, ENGLAND.

PROCESS OF PREPARING FLAKED CEREALS.

SPECIFICATION forming part of Letters Patent No. 332,073, dated December 8, 1885.

Application filed April 15, 1885. Serial No. 162,349. (No specimens.)

*To all whom it may concern:*

Be it known that we, ALEXANDER WILLIAM GILLMAN and SAMUEL SPENCER, subjects of the Queen of Great Britain, both of the Castle Brewery, St. George's Road, Southwark, in the county of Surrey, England, consulting practical brewers and analytical chemists, have invented certain new and useful Improvements in the Treatment of Grain or Cereals to be Used in Brewing, Distilling, and Vinegar-Making; and we do hereby declare that the following is a full, clear, and exact description of the invention, which will enable others skilled in the art to which it appertains to make and use the same.

The invention relates to improvements in the treatment of grain or cereals to be used in brewing, distilling, and vinegar-making, in order to facilitate the conversion of the grain in the mashing process, and whereby the expense and waste incurred in the process of malting by germination are avoided, while by our process we gelatinize or rupture the starch granules contained in the grain, and convert them more or less into dextrine and sugar, and at the same time alter the condition of the albumenoids contained in the grain, thereby rendering the constituents of the grain partly soluble in water and suitable to be afterwards treated with diastase or extract of germinated malt at the proper temperatures for its complete conversion.

For the above purpose we first soak the raw, crushed, or whole grain in water at a temperature of from about 130° to 155° Fahrenheit, according to the character of the grain under treatment, in order to soften the grain and facilitate the action of steam thereon in the subsequent process. For this soaking process we use hot water of the minimum temperature above mentioned, in order to prevent any unsound or acid fermentation taking place during such process, and we limit the temperature of the water to the maximum above mentioned, in order to prevent the premature rupture of the starch granules. After the grain has been soaked a sufficient time the surplus water should then be drained off therefrom.

We find, when treating whole barley by soaking in water at the above temperatures, it should be kept immersed for from about thirty to forty hours; but when treating crushed barley an immersion of about from one to three hours will be found sufficient.

When soaking whole maize or Indian corn, we find it should be kept immersed in water at the above temperatures for from about fifteen to twenty hours; but when treating crushed maize or Indian corn an immersion of about two to four hours will be found sufficient.

When soaking whole rice, we find it should be kept immersed for from about two to three hours; but when treating crushed or broken rice an immersion of from about one to two hours will be found sufficient.

When treating other descriptions of grain, the time of soaking and the temperatures must be varied, according to the description and character of the grain used, and the length of time for soaking crushed or broken grain will vary, according to the size of the particles.

After the whole or crushed grain has been sufficiently soaked and the surplus water has been drained off therefrom, the moist grain is placed in a vessel capable, when closed, of sustaining a considerable steam-pressure. In this vessel we submit the grain to the action of steam under pressure, either at its normal temperature, or preferably superheated, for sufficient time to effect the above-mentioned change in the constituents of the grain. The pressure and temperature of the steam are regulated according to the nature of the different kinds of grain and the amount of gelatinization or conversion thereof desired to be produced.

We preferably employ superheated steam for the above purpose, in order that it may be maintained at the required temperature in presence of the moist grain, and that it may be prevented from being reduced to too low a temperature by contact with the cold wet grain.

For grain soaked as hereinbefore described we find the following pressures and temperatures of steam and periods during which it is submitted to the action of such steam produce the desired conversion: for whole barley, a pressure of about ten to fifteen pounds to the square inch, maintained for about ten to fifteen minutes; for crushed barley, a pressure of about five to ten pounds to the square inch, maintained for about five to ten minutes; for whole maize or Indian corn, a pressure of about twenty-five pounds to the square inch, maintained for about five to ten minutes; for crushed maize or Indian corn, a pressure of about twenty pounds to the square inch, maintained for about three to five minutes; for whole rice, a pressure of about twenty pounds to the square inch maintained for about two to three minutes; for crushed rice, a pressure of about twenty pounds to the square inch, maintained for about one to two minutes. During this steaming process the temperature is maintained at from about 260° to 300° Fahrenheit.

If a further conversion of the starch granules into dextrine and sugar than that produced by the above process be desired, the grain must be submitted to higher pressures and temperatures and for longer periods than those above indicated.

By these means the grain is not reduced to a soft pulpy condition, as when boiling the same in a quantity of water under steam-pressure; but the steam and temperature produce the desired effect, somewhat swelling the grain, but do not impart any unnecessary quantity of moisture thereto.

It will be evident that the pressure of the steam and the length of time to which the grain is submitted to its action may be somewhat varied; but in such case, if the pressure of the steam be reduced, the length of time should be proportionately increased, and vice versa.

Previous to operating on the grain in the steaming vessel or chamber the air is driven out of the latter, thereby preventing oxidation and acidity at the high temperatures employed.

Grain treated in the manner above described, if merely dried and crushed or ground, and then used in the brewing or mashing process, would, especially when using rice and maize, more or less subside and settle on the bottom of the mash-tun, and this, in consequence of obstructing the drainage of the wort, would be prejudicial or unfavorable to obtaining the greatest degree of extract from the grain. We, therefore, in order to obviate this defect, give it a very extended surface, which has the effect of causing it to float or to remain in suspension in the mash a sufficient time to allow of its proper conversion, thus enabling the diastase of the germinated malt mixed therewith to attack and act upon all its parts, and thereby materially hasten its conversion and insure the whole of the starch granules being acted upon. In carrying this part of our invention into effect we pass the grain after partial drying, but still in a soft condition, between rolls, either cold, or preferably heated by steam, gas, or other heating media, in order to assist the drying process and prevent the grain sticking to the rolls, while in the event of any of the grain being hard, such heat of the rolls will act to soften the same, and thereby assist the action of the rolls upon the grain. This will have the effect of flattening the grain, and it will leave the rolls in the form of thin films, sheets, flakes, or wafers, which may be further dried, if required, and then mixed with germinated barley malt and mashed, and employed in the process of brewing, distilling, and vinegar-making in the ordinary manner.

We are aware that corn-flakes, which are produced by, first, crushing the corn in a dry state and separating the hulls therefrom, second, steaming the granular material to soften and toughen the particles without cooking the same, and, third, pressing and drying the particles, have been used in the art of brewing malt-liquors, and do not claim such as our invention. Neither do we claim in this application the invention described in Letters Patent of Great Britain, No. 344, which were granted to us on the 26th day of January, 1881.

Having thus described the nature of our said invention and in what manner the same is carried into effect, we declare that what we claim is—

Treating grain for brewing, distilling, and vinegar-making by the combined process of soaking it in hot water at about the temperatures stated, then steaming it at about the pressures and temperatures named, then partially drying it, then flattening it by passing it through rolls or otherwise, and then further drying it, if required, substantially as herein described, and for the purpose stated.

ALEX. W. GILLMAN.
SAML. SPENCER.

Witnesses:
C. M. WHITE,
23 Southampton Buildings, London.
JOHN D. VENN,
9 Gracechurch Street, London.